(12) United States Patent
Machida et al.

(10) Patent No.: US 9,558,891 B2
(45) Date of Patent: Jan. 31, 2017

(54) POLYMERIZATION SOLUTION, CONDUCTIVE POLYMER FILM OBTAINED FROM THE POLYMERIZATION SOLUTION, AND SOLID ELECTROLYTIC CAPACITOR

(75) Inventors: Kenji Machida, Tokyo (JP); Sekihiro Takeda, Tokyo (JP); Ryo Muroi, Tokyo (JP); Nozomu Kamiyama, Tokyo (JP); Masashi Ozawa, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 648 days.

(21) Appl. No.: 14/002,281

(22) PCT Filed: Mar. 1, 2012

(86) PCT No.: PCT/JP2012/055285
§ 371 (c)(1),
(2), (4) Date: Sep. 27, 2013

(87) PCT Pub. No.: WO2012/118162
PCT Pub. Date: Sep. 7, 2012

(65) Prior Publication Data
US 2014/0016248 A1    Jan. 16, 2014

(30) Foreign Application Priority Data

Mar. 1, 2011    (JP) .................................. 2011-044444
Dec. 19, 2011   (JP) .................................. 2011-277674

(51) Int. Cl.
*H01G 9/00*      (2006.01)
*H01G 9/02*      (2006.01)
(Continued)

(52) U.S. Cl.
CPC ............ *H01G 9/028* (2013.01); *H01G 9/0036* (2013.01); *C08G 2261/3223* (2013.01); *C08G 2261/51* (2013.01); *H01G 9/15* (2013.01)

(58) Field of Classification Search
CPC .......... H01G 9/15; H01G 9/012; H01G 9/028; H01G 9/025
(Continued)

(56) References Cited

U.S. PATENT DOCUMENTS

| 4,959,430 A | 9/1990 | Jonas et al. |
| 5,187,650 A | 2/1993 | Kudoh et al. |

(Continued)

FOREIGN PATENT DOCUMENTS

| JP | 61-239617 A | 10/1986 |
| JP | 1-313521 A  | 12/1989 |

(Continued)

OTHER PUBLICATIONS

"Synthesis of High-Function Conductive Polymers (PPy, PEDOT, etc.), Development of Application Fields to Electronic and Energy Devices and Future Prospects", Proceedings, May 28, 2010, pp. 30-33.
(Continued)

*Primary Examiner* — Eric Thomas
*Assistant Examiner* — Arun Ramaswamy
(74) *Attorney, Agent, or Firm* — Birch, Stewart, Kolasch & Birch, LLP

(57) ABSTRACT

Disclosed is a polymerization solution for electrolytic polymerization containing borodisalicylic acid and/or a salt thereof as a supporting electrolyte, in which precipitation due to the hydrolysis of borodisalicylate ions is inhibited and which provides a conductive polymer exhibiting excellent heat resistance. The polymerization solution has: a solvent consisting of 100 to 80% by mass of water and 0 to 20% by mass of an organic solvent; at least one monomer having a π-conjugated double bond; at least one supporting electrolyte selected from the group consisting of borodisalicylic acid and borodisalicylic salts; and at least one stabilizing (Continued)

agent selected from the group consisting of nitrobenzene and nitrobenzene derivatives, and the content of the stabilizing agent content is more than ⅛ mol per 1 mol of the supporting electrolyte. A complex is formed by the stabilizing agent and borodisalicylic acid, and the formation of precipitation due to the hydrolysis of borodisalicylate ions is inhibited.

20 Claims, 1 Drawing Sheet

(51) Int. Cl.
   *H01G 9/04*      (2006.01)
   *H01G 9/145*     (2006.01)
   *H01G 9/028*     (2006.01)
   *H01G 9/15*      (2006.01)

(58) Field of Classification Search
   USPC ................................ 361/523, 525, 528, 532
   See application file for complete search history.

(56) References Cited

U.S. PATENT DOCUMENTS

2005/0237696 A1  10/2005  Takeda et al.

2009/0128997 A1 *  5/2009  Kikuchi .................. C23C 28/00
                                                                361/524

FOREIGN PATENT DOCUMENTS

| JP | 2-58818 A | 2/1990 |
|---|---|---|
| JP | 3-18009 A | 1/1991 |
| JP | 4-315412 A | 11/1992 |
| JP | 10-289839 A | 10/1998 |
| JP | 10289839 A * | 10/1998 |
| JP | 2000-269087 A | 9/2000 |
| JP | 2000336154 A * | 12/2000 |
| JP | 2004-288958 A | 10/2004 |
| JP | 2005-11925 A | 1/2005 |
| JP | 2005-200518 A | 7/2005 |
| JP | 2010-37466 A | 2/2010 |
| JP | 2010-247360 A | 11/2010 |
| JP | 2010-267868 A | 11/2010 |
| JP | 2010-278200 A | 12/2010 |

OTHER PUBLICATIONS

International Search Report, dated May 29, 2012, for International Application No. PCT/JP2012/055285.

* cited by examiner

POLYMERIZATION SOLUTION, CONDUCTIVE POLYMER FILM OBTAINED FROM THE POLYMERIZATION SOLUTION, AND SOLID ELECTROLYTIC CAPACITOR

BACKGROUND OF THE INVENTION

1. Field of the Invention

The present invention relates to a polymerization solution for electrolytic polymerization having a small environmental load, having excellent economic efficiency and providing a conductive polymer exhibiting excellent heat resistance. The present invention also relates to a conductive polymer film and a solid electrolytic capacitor obtained from the polymerization solution.

2. Description of the Related Art

A conductive polymer obtained from polymerization of monomer having a π-conjugated double bond such as thiophene, aniline and pyrrol is excellent in conductivity and suitable for various kinds of electrochemical purposes, and has been applied in a wide range of fields such as solid electrolytic capacitors, polymer batteries, antistatic films, indicating elements, sensors and electrode materials. For example, the conductive polymer is preferably used in a solid electrolytic capacitor that contains a positive electrode made of valve metal foil such as aluminum foil, tantalum foil and niobium foil that has an oxide film as a dielectric on the surface, and a conductive polymer film that is adjacent to the oxide film and acts as a real negative electrode.

A polymerization solution for electrolytic polymerization used for preparing the conductive polymer usually contains a monomer having a π-conjugated double bond, a supporting electrolyte and a solvent for dissolving them.

The solvent of the polymerization solution is appropriately selected considering the solubility of the monomer. For example, Patent Document 1 (JP 61-239617 A) discloses a method of preparing a conductive polymer film by electrolytic polymerization of aniline substituted by an alkyl group or an alkoxyl group, and in working examples, water is used as a solvent of a polymerization solution. Patent Document 2 (JP 1-313521 A) discloses a method of preparing a conductive polymer by electrolytic polymerization of 3,4-disubstituted thiophene including 3,4-ethylenedioxythiophene (3,4-ethylenedioxythiophene is hereinafter referred to as "EDOT" and poly(3,4-ethylenedioxythiophene) is hereinafter referred to as "PEDOT"), and in working examples, acetonitrile is used as a solvent of a polymerization solution. Also, Patent Document 3 (JP 3-18009 A) discloses a solid electrolytic capacitor that contains a conductive polymer film formed by electrolytic polymerization of non-substituted pyrrol, and in working examples, acetonitrile or water is used as a solvent of a polymerization solution.

The supporting electrolyte acting also as a dopant is appropriately selected considering its solubility in the solvent and the fact that the dopant is not easily detached from a polymer obtained, and is used with a concentration at which sufficient current can be obtained for electrolytic polymerization. A vast number of supporting electrolytes have been suggested so far. For example, Patent Document 4 (JP 2010-37466 A) summarizes in paragraph 0026 dopants emitted from supporting electrolytes conventionally suggested such as perchlorate ion, p-toluenesulfonate ion and borodisalicylate ion, and suggests a benzenesulfonic acid salt substituted by a branched alkyl group as a supporting electrolyte that provides higher heat resistance than conventional supporting electrolytes. Patent Document 5 (JP 2000-269087 A) discloses using an aqueous polymerization solution in which a thiophene derivative is emulsified by an alkylnaphthalenesulfonate surfactant to produce a solid electrolytic capacitor. Because of the bulkiness of an alkylnaphthalenesulfonate anion which is taken into the polymer layer as a dopant by electrolytic polymerization, de-doping is inhibited, and a solid electrolytic capacitor, which is stable under high temperature and high humidity, is obtained. Further, Non-Patent Document 1 ("Synthesis of High-Function Conductive Polymers (PPy, PEDOT, etc.), Development of Application Fields to Electronic and Energy Devices and Future Prospects" Proceedings, pp. 30-33) describes electrolytic polymerization of pyrrol, and sodium triisopropylnaphthalenesulfonate is used as a supporting electrolyte.

However, the use of organic solvents generally increase environmental burdens and is economically disadvantageous compared with the use of water. Moreover, many of the organic solvents are harmful to humans, and in the case of electrolytic polymerization using a combustible solvent, procedures need to be taken to prevent fire by electric spark. Therefore, it is preferable to use water as a solvent of a polymerization solution, and it is also preferable to use an inexpensive supporting electrolyte that is dissolved in water.

Among the supporting electrolytes that have been known so far, borodisalicylic acid and/or its salt are comparatively inexpensive and economically advantageous, but on the other hand, it is known that precipitation is rapidly produced when borodisalicylic acid and/or its salt are dissolved in water and stirred, or that even if it is not stirred, precipitation is gradually produced. Therefore, if borodisalicylic acid and/or its salt are selected as a supporting electrolyte for electrolytic polymerization of monomer with a π-conjugated double bond, an organic solvent has been selected. For example, in Patent Document 6 (JP 2-58818 A), a solid electrolytic capacitor is obtained by electrolytic polymerization in which a polymerization solution containing an organic solvent, a monomer such as pyrrol, and an alkyl-substituted ammonium borodisalicylate as a supporting electrolyte is used. The alkyl-substituted ammonium borodisalicylate is selected as the supporting electrolyte dissolved in the organic solvent. This document also states that a polymerized film with a problem in terms of thermal stability is obtained from a polymerization solution that is prepared by using ammonium borodisalicylate, which has low solubility in an organic solvent, as a supporting electrolyte, and adding water to organic solvents

PRIOR ARTS DOCUMENTS

Patent Documents

Patent Document 1: JP 61-239617 A
Patent Document 2: JP 1-313521 A
Patent Document 3: JP 3-18009 A
Patent Document 4: JP 2010-37466 A
Patent Document 5: JP 2000-269087 A
Patent Document 6: JP 2-58818 A

Non-Patent Documents

Non-patent Document 1: Synthesis of High-Function Conductive Polymers (PPy, PEDOT, etc.), Development of Application Fields to Electronic and Energy Devices and Future Prospects" Proceedings, pp. 30-33, lecture date: May 28, 2010, lecture venue: Chuo University, Surugadai Memorial Hall in Japan

BRIEF SUMMARY OF THE INVENTION

1. Problems to be Solved by the Invention

Precipitation is produced when borodisalicylic acid and/or its salt are dissolved in water because salicylic acid and boric acid, which have extremely small solubility in water, are generated by the hydrolysis of borodisalicylate ions. FIG. 1, for reference, shows the FT-IR spectrum of precipitation that is generated when ammonium borodisalicylate is dissolved in water as compared to the FT-IR spectra of salicylic acid and boric acid. As is apparent from this figure, the precipitation contains salicylic acid and boric acid.

Although it used to be difficult to use the inexpensive borodisalicylic acid and/or its salt in an aqueous polymerization solution due to the precipitation formation, when an experiment by the inventors was carried out to perform electrolytic polymerization by introducing an electrode (a substrate of a conductive polymer film, a positive electrode of a solid electrolytic capacitor) to the polymerization solution before the precipitation formation immediately after dissolution of borodisalicylic acid and/or its salt, it was found that a conductive polymer film densely filled with polymer particles was formed on the electrode. Further, the conductive polymer film obtained showed excellent electrochemical activity and the solid electrolytic capacitor obtained showed a reduced dielectric loss (tan δ) and a reduced equivalent series resistance (ESR). In addition, the conductive polymer film and solid electrolytic capacitor obtained showed not only higher heat resistance than the conductive polymer film and solid electrolytic capacitor obtained from the polymerization solution that contained an anionic surfactant with a sulfonic acid group or a sulfonic acid salt group shown in Patent Document 5 and Non-Patent Document 1, but also higher heat resistance than the conductive polymer film and solid electrolytic capacitor obtained from the polymerization solution containing a large amount of organic solvent. In view of the statement in Patent Document 6 that heat resistance of a polymer film is reduced by adding water to a polymerization solution, the results of the above-mentioned experiment are remarkable.

These results themselves of the experiment carried out by the inventors are new findings, but unfortunately, precipitation started to be produced when polymerization ended, which made it difficult to reuse the same polymerization solution. Therefore, if the problem of this precipitation is solved, it can be expected to obtain a remarkably preferable polymerization solution that provides a conductive polymer with excellent heat resistance, which has a small environmental burden, has excellent economic efficiency, and can be used repeatedly.

Therefore, the objective of the present invention is to provide a polymerization solution comprising water as a main solvent, a monomer having a π-conjugated double bond and borodisalicylic acid and/or its salt as a supporting electrolyte, in which precipitation formation due to the hydrolysis of borodisalicylate ions is inhibited, and which provides a conductive polymer exhibiting excellent heat resistance.

2. Means for Solving Problems

It was found that the above-mentioned objective was achieved by making an appropriate amount of nitrobenzene and/or a nitrobenzene derivative coexist as a stabilizing agent in the polymerization solution.

Therefore, the present invention relates firstly to a polymerization solution for electrolytic polymerization comprising a solvent consisting of 100 to 80% by mass of water and 0 to 20% by mass of an organic solvent, at least one monomer having a π-conjugated double bond, at least one supporting electrolyte selected from the group consisting of borodisalicylic acid and borodisalicylic salts, and at least one stabilizing agent selected from the group consisting of nitrobenzene and nitrobenzene derivatives, wherein the content of the stabilizing agent is more than ⅛ mol per 1 mol of the supporting electrolyte. The solvent consisting of 100 to 80% by mass of water and 0 to 20% by mass of an organic solvent is hereinafter referred to as a "water-rich solvent". In the water-rich solvent, the total amount of water and an organic solvent is 100% by mass. The content of water in the water-rich solvent is acceptable if it is 80% by mass or more, but 90% by mass or more is preferable, 95% by mass or more is more preferable, and 100% by mass is particularly preferable.

FIG. 2 shows UV spectra of a solution in which ammonium borodisalicylate is dissolved with a concentration of 0.267 mM, a solution in which p-nitrophenol is dissolved with a concentration of 0.083 mM, and a solution in which ammonium borodisalicylate and p-nitrophenol are dissolved with a concentration of 0.267 mM and 0.083 mM, respectively. While maximal absorption takes a value of 298 nm in the UV spectrum of the ammonium borodisalicylate solution and 317 nm in the UV spectrum of the p-nitrophenol solution, maximal absorption takes a value of 306 nm in the UV spectrum of the solution containing both ammonium borodisalicylate and p-nitrophenol. This seems to show that another compound (hereinafter referred to as a "complex") is generated from ammonium borodisalicylate and p-nitrophenol. From the solution containing ammonium borodisalicylate and p-nitrophenol, precipitation was not produced. This appears to be because the hydrolysis of borodisalicylate ions is inhibited by this complex formation. Moreover, a similar phenomenon was observed when nitrobenzene or other nitrobenzene derivatives were used instead of p-nitrophenol. From the above, it is considered that the complex is formed by electrostatic interaction between a borodisalicylate anion and a nitro group of the stabilizing agent.

Even when electrolytic polymerization was repeatedly performed by using the polymerization solution containing a water-rich solvent, at least one monomer having a π-conjugated double bond, at least one supporting electrolyte selected from the group consisting of borodisalicylic acid and borodisalicylic salts and at least one stabilizing agent selected from the group consisting of nitrobenzene and nitrobenzene derivatives, precipitation was not produced in the polymerization solution, and the conductive polymer obtained showed excellent heat resistance similar to that of the conductive polymer obtained from the polymerization solution without a stabilizing agent immediately after dissolution of borodisalicylic acid and/or its salt (before precipitation formation). In the light of the above, it is considered that the hydrolysis of borodisalicylate ions is inhibited by the complex formation and that a conductive polymer film with excellent heat resistance is obtained as a result of the fact that a borodisalicylate ion is included in the conducting polymer film as a dopant in the process of electrolytic polymerization.

At least one stabilizing agent selected from the group consisting of nitrobenzene and nitrobenzene derivatives can be either a single compound or two or more types of compounds. However, a compound with a saturated solubility of ⅛ mol or less per 1 mol of the supporting electrolyte is used in combination with other compounds. If the content of the stabilizing agent is ⅛ mol or less per 1 mol of the supporting electrolyte, the inhibition of precipitate formation can be insufficient. The content of the stabilizing agent is preferably ¼ mol or more, more preferably ½ mol or more, and particularly preferably 1 mol or more per 1 mol of the supporting electrolyte. The stabilizing agent having high solubility in water is preferable, and at least one compound selected from the group consisting of o-nitrophenol, m-nitrophenol and p-nitrophenol is particularly preferable. The stabilizing agent is used to inhibit the precipitation formation due to the hydrolysis of borodisalicylate ions by forming the complex with a borodisalicylate ion, and it is therefore added to the water-rich solvent almost at the same time as borodisalicylic acid and/or its salt, and preferably added to the water-rich solvent prior to borodisalicylic acid and/or its salt.

The use itself of nitrobenzene or its derivatives in a polymerization solution for electrolytic polymerization is disclosed in Patent Document 4, Patent Document 5 and Non-Patent Document 1. Patent Document 4 and Non-Patent Document 1 state that p-nitrophenol is added to a polymerization solution for manufacturing polypyrrole. Non-Patent Document 1 also states that a polymeric structure of polypyrrole is changed by an action of p-nitrophenol. Patent Document 5 discloses a thiophene derivative polymer is obtained that has high regularity and has a developed conjugation length by using nitrobenzene or its derivatives. However, the action of nitrobenzene or its derivatives in the present invention is to inhibit the precipitation formation due to the hydrolysis of borodisalicylate ions by forming the complex with a borodisalicylate ion, and it differs from the action of nitrobenzene or its derivatives in these documents. Also, it is not disclosed in any of these documents that the precipitation formation due to the hydrolysis of borodisalicylate ions in the water-rich solvent is inhibited by forming a complex with nitrobenzene or its derivative and a borodisalicylate ion, and that a conductive polymer film with excellent heat resistance is obtained by using a polymerization solution in which borodisalicylic acid and/or its salt and nitrobenzene and/or its derivative are used concurrently.

In the present invention, it is acceptable that the monomer of the saturated amount of dissolution or less is contained in the polymerization solution and the total amount of the monomer is dissolved in the polymerization solution, but it is also acceptable that the monomer of more than the saturated amount of dissolution is contained in the polymerization solution and the monomer that cannot be dissolved is dispersed as oil drops in the polymerization solution. By radiating ultrasonic waves into the solution containing the monomer of more than the saturated amount, it is possible to make the monomer highly dispersed in the polymerization solution as oil drops and a stable polymerization solution in which demulsification is inhibited can be obtained. If the size of the oil drops is minute, a dense electroconductive polymer film is formed on the electrode by immediate charge transfer between these oil drops and the electrode for electrolytic polymerization. As the size of oil drops becomes larger, immediate charge transfer between the oil drops and the electrode becomes more difficult, and the monomer dissolved in the polymerization solution becomes engaged in electrolytic polymerization exclusively, but because the amount of the monomer equivalent to the consumed amount of monomer due to polymerization is replenished from oil drops near the electrode and is dissolved in the solution, electrolytic polymerization proceeds rapidly. Herein, the "ultrasonic waves" mean sonic waves that have a frequency of 10 kHz or more.

The method itself to make use of irradiation of ultrasonic waves in the preparation of a polymerization solution for electrolytic polymerization is heretofore known. J. AM. CHEM. SOC. (2005), 127 (38), 13160-13161 reports the results of the experiment in which a larger amount of EDOT than the saturated amount of dissolution is added to a solution with $LiClO_4$ as a supporting electrolyte, an emulsified polymerization solution in which monomer oil drops are dispersed in water is obtained by radiating ultrasonic waves of frequency 20 kHz and of output 22.6 $W/cm^2$ for 60 seconds (see FIG. 1 in this document), and an electrolytic polymerization layer is formed on a Pt electrode with this polymerization solution. However, this document does not contain a statement that suggests concurrent use of at least one supporting electrolyte, which is selected from the group consisting of borodisalicylic acid and borodisalicylic salts, and at least one stabilizing agent selected from the group consisting of nitrobenzene and nitrobenzene derivatives, both of which are used in this invention, nor a statement that suggests that a conductive polymer film with excellent heat resistance can be obtained by this combination.

The polymerization solution of the present invention can further comprise a water-soluble nonionic surfactant. Since the monomer is condensed in a micelle of the nonionic surfactant, electrolytic polymerization progresses rapidly, and a polymer showing high conductivity is obtained. Further, because the nonionic surfactant itself is not ionized, doping by a dopant is not inhibited, and the complex formation of the stabilizing agent and a borodisalicylate ion is not inhibited either. Therefore, an equivalent heat resistance is shown in a conductive polymer film obtained from a polymerization solution that does not contain a nonionic surfactant and a conductive polymer film obtained from a solution that does contain a nonionic surfactant. As the nonionic surfactant, a nonionic surfactant publicly known can be used without restriction, but it is preferable if a combination of an alkynediol, which has a high dispersion effect, and other nonionic surfactants, preferably a polyoxyethylene alkylphenyl ether, is used in the polymerization solution because the monomer content in the polymerization solution can be increased to a great extent.

By using the polymerization solution of the present invention, the conductive polymer film with excellent heat resistance can be obtained. Therefore, the present invention also relates to a conductive polymer film obtained by introducing a substrate having a conductive part into the polymerization solution of the present invention and performing electrolytic polymerization.

The polymerization solution of the present invention can further be suitably used to manufacture a solid electrolytic capacitor containing a positive electrode in which an oxide film as a dielectric is disposed on a surface of foil made of valve metal such as aluminum, tantalum and niobium, and a conductive polymer film contacting the oxide film and acting as a real negative electrode. By using the polymerization solution of the present invention, it is possible to obtain a capacitor that has excellent heat resistance as well as reduced tan δ and ESR. When a solid electrolytic capacitor is manufactured before precipitate formation by using a polymerization solution that contains only borodisalicylic acid and/or its salt and does not contain a stabilizing agent, and a solid electrolytic capacitor is manufactured again after precipitate formation, the ESR of the solid electrolytic capacitor obtained from the polymerization solution after precipitate formation increases more than the ESR of the solid electrolytic capacitor obtained from the polymerization solution before precipitate formation. However, this increase in ESR is inhibited by using the stabilizing agent in the polymerization solution. Therefore, it is possible to form a solid electrolytic capacitor with improved reproducibility by repeatedly using the same polymerization solution.

Therefore, the present invention also relates to the first form of a solid electrolytic capacitor, a solid electrolytic capacitor that comprises a positive electrode made of valve metal foil with an oxide film on the surface and a conductive polymer layer placed on the positive electrode, in which the conductive polymer layer is formed by introducing the positive electrode into the polymerization solution of this invention and by performing electrolytic polymerization. In the first form of the solid electrolytic capacitor, a conductive layer (a dummy negative electrode) is generally formed on the conductive polymer.

The present invention also relates to the second form of a solid electrolytic capacitor, a solid electrolytic capacitor that comprises a positive electrode made of valve metal foil with an oxide film on the surface, a negative electrode made of valve metal foil, and a separator that retains a conductive polymer layer placed between the positive electrode and the negative electrode, in which the conductive polymer layer is formed by introducing a condenser element comprising the positive electrode, the negative electrode, and a separator therebetween into the polymerization solution of the present invention and performing electrolytic polymerization. The conductive polymer layer is retained in the separator by electrolytic polymerization. The capacitor of this form is preferably used as a wound or layered capacitor.

As the monomer having a π-conjugated double bond in the polymerization solution of the present invention, a monomer that is conventionally used for manufacturing the conductive polymer can be used if it is stable in the water-rich solvent. If EDOT is used as the monomer, it is especially preferable because a PEDOT film, which has excellent heat resistance and permeability (transparency) to an optical wavelength and that has high conductivity and electrochemical capacity, can be obtained, and because a solid capacitor that has excellent heat resistance as well as especially low tan δ and ESR can be obtained.

3. Advantageous Effects of the Invention

The polymerization solution of the present invention comprising a water-rich solvent, at least one monomer having a π-conjugated double bond, at least one supporting electrolyte selected from the group consisting of borodisalicylic acid and borodisalicylic salts, and at least one stabilizing agent selected from the group consisting of nitrobenzene and nitrobenzene derivatives, can be repeatedly used for electrolytic polymerization, because the precipitate formation by the hydrolysis of borodisalicylate ions in the water-rich solvent is inhibited by the complex formation of the stabilizing agent and a borodisalicylate ion. Also, the polymerization solution of the present invention has a small environmental burden and is excellent in economic efficiency. Further, by the use of the polymerization solution of the present invention, it is possible to obtain a conductive polymer film and a solid electrolytic capacitor which are excellent in heat resistance.

Figure 1:
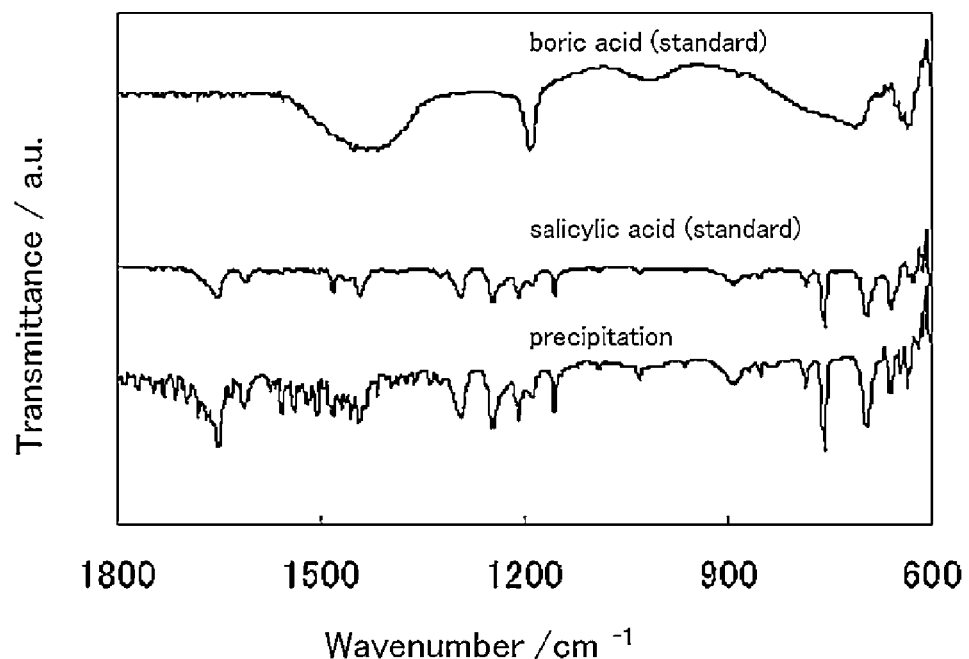
FIG. 1 shows a FT-IR spectrum of precipitates produced by the hydrolysis of ammonium borodisalicylate.
Figure 2:
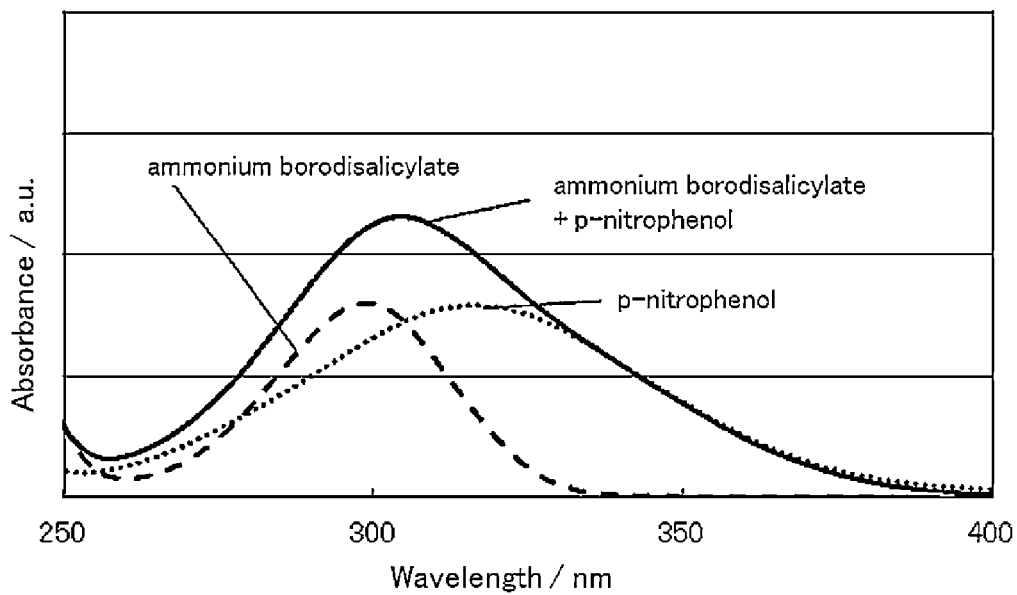
FIG. 2 shows UV spectra of ammonium borodisalicylate, p-nitrophenol and a mixture of these.

DETAILED DESCRIPTION OF THE INVENTION (1) Polymerization Solution

A polymerization solution for electrolytic polymerization of the present invention comprises as essential components a water-rich solvent, at least one monomer having a π-conjugated double bond, at least one supporting electrolyte selected from the group consisting of borodisalicylic acid and borodisalicylic salts, and at least one stabilizing agent selected from the group consisting of nitrobenzene and nitrobenzene derivatives. In the polymerization solution of the present invention, water, which has a small environmental burden and is economically excellent, is used as a main solvent. In the polymerization solution of the present invention, an organic solvent such as methanol, ethanol, isopropanol, butanol, ethylene glycol, acetonitrile, acetone, tetrahydrofuran, and methyl acetate may be contained, but 80% by mass or more of the total solvent is water. Water is preferably 90% by mass or more of the total, more preferably 95% by mass or more of the total, and it is especially preferred that the solvent consists only of water. When the amount of the organic solvent contained in the water-rich solvent is increased, a conductive polymer film in which polymer particles are densely filled becomes difficult to be formed on an electrode by electrolytic polymerization, and if the amount of the organic solvent contained exceeds 20% by mass of the whole solvent, the heat resistance of a conductive polymer film and solid electrolytic capacitor obtained is remarkably lowered.

In the polymerization solution of the present invention, the monomer having a π-conjugated double bond is used as a monomer to be polymerized. If it is stable in the water-rich solvent, a monomer with a π-conjugated double bond that is used for manufacturing the conventional conductive polymer can be used. Examples of typical monomers are described below. These monomers can be used alone or can be used as a mixture of two or more types.

Firstly, thiophene and thiophene derivatives including: 3-alkylthiophenes such as 3-methylthiophene and 3-ethylthiophene; 3,4-dialkylthiophenes such as 3,4-dimethylthiophene and 3,4-diethylthiophene; 3-alkoxythiophenes such as 3-methoxythiophene and 3-ethoxythiophene; 3,4-dialkoxythiophenes such as 3,4-dimethoxythiophene and 3,4-diethoxythiophene; 3,4-alkylenedioxythiophenes such as 3,4-methylenedioxythiophene, EDOT and 3,4-(1,2-propylenedioxy)thiophene; 3,4-alkyleneoxythiathiophenes such as 3,4-methyleneoxythiathiophene, 3,4-ethyleneoxythiathiophene and 3,4-(1,2-propyleneoxythia)thiophene; 3,4-alkylenedithiathiophenes such as 3,4-methylenedithiathiophene, 3,4-ethylenedithiathiophene and 3,4-(1,2-propylenedithia)thiophene; and alkylthieno[3,4-b]thiophenes such as thieno[3,4-b]thiophene, isopropylthieno[3,4-b]thiophene and t-butyl-thieno[3,4-b]thiophene, can be used.

Also, pyrrol and pyrrol derivatives including: N-alkylpyrrols such as N-methylpyrrol and N-ethylpyrrol; 3-alkylpyrrols such as 3-methylpyrrol and 3-ethylpyrrol; 3-alkoxypyrrols such as 3-methoxypyrrol and 3-ethoxypyrrol; N-phenylpyrrol; N-naphthylpyrrol; 3,4-dialkylpyrrols such as 3,4-dimethylpyrrol and 3,4-diethylpyrrol; and 3,4-dialkoxypyrrols such as 3,4-dimethoxypyrrol and 3,4-diethoxypyrrol, can be used.

Further, aniline and aniline derivatives including: 2,5-dialkylanilines such as 2,5-dimethylaniline and 2-methyl-5-ethylaniline; 2,5-dialkoxyanilines such as 2,5-dimethoxyaniline and 2-methoxy-5-ethoxyaniline; 2,3,5-trialkoxyanilines such as 2,3,5-trimethoxyaniline and 2,3,5-trimethoxyaniline; and 2,3,5,6-tetraalkoxyanilines such as 2,3,5,6-tetramethoxyaniline and 2,3,5,6-tetramethoxyaniline, can be used.

Furthermore, furan and furan derivatives including: 3-alkylfurans such as 3-methylfuran and 3-ethylfuran; 3,4-dialkylfurans such as 3,4-dimethylfuran and 3,4-diethylfuran; 3-alkoxyfurans such as 3-methoxyfuran and 3-ethoxyfuran; and 3,4-dialkoxyfurans such as 3,4-dimethoxyfuran and 3,4-diethoxyfuran, can be used.

As the monomer, a monomer selected from 3,4-disubstituted thiophenes is preferably used. Substituents at the 3- and 4-positions of the thiophene ring can form a ring with carbons at the 3- and 4-positions. In particular, EDOT is preferably used.

The polymerization solution of the present invention comprises as the supporting electrolyte a compound selected from the group consisting of borodisalicylic acid and borodisalicylic salts, in addition to the above-mentioned monomer. The compounds may be used alone or may be used as a mixture of two or more types. Borodisalicylic acid and/or its salt is used with a concentration of a saturated amount of dissolution or less for a polymerization solution and in an amount to obtain sufficient currents for electrolytic polymerization, and is preferably used with a concentration of 10 mM or more, and most preferably with a concentration of 30 mM or more.

Examples of borodisalicylic salts are: ammonium salt; alkylammonium salts such as ethylammonium salt and butylammonium salt; dialkylammonium salts such as diethylammonium salt and dibutylammonium salt; trialkylammonium salts such as triethylammonium salt and tributylammonium salt; tetraalkylammonium salts such as tetraethylammonium salt and tetrabutylammonium salt; alkali metal salts such as lithium salt, sodium salt and potassium salt; and alkaline earth metal salts such as magnesium salt and calcium salt.

The polymerization solution of the present invention further comprises as the stabilizing agent nitrobenzene and/or a nitrobenzene derivative having an action of inhibiting the precipitate production due to the hydrolysis of borodisalicylate ions in the water-rich solvent by forming a complex with a borodisalicylate ion. The stabilizing agent is used with a concentration of a saturated amount of dissolution or less for the polymerization solution and is used in an amount of more than ⅛ mol per 1 mol of the supporting electrolyte selected from the group consisting of borodisalicylic acid and borodisalicylic salts. The stabilizing agent can be a single compound or two or more types of compounds, but a compound with a saturated solubility in the polymerization solution of ⅛ mol or less per 1 mol of the supporting electrolyte is used concurrently with other compounds. If the amount of the stabilizing agent is ⅛ mol or less per 1 mol of the supporting electrolyte, the inhibition of precipitate formation can be insufficient. The content of the stabilizing agent is preferably ¼ mol or more, more preferably ½ mol or more, and most preferably 1 mol or more per 1 mol of the supporting electrolyte. Examples of nitrobenzene derivatives are: nitrophenol, nitrobenzyl alcohol, nitrobenzoic acid, dinitrobenzoic acid, dinitrobenzene, nitroanisole and nitroacetophenone. The stabilizing agent is preferably a compound having high solubility in water and most preferably o-nitrophenol, m-nitrophenol, p-nitrophenol, or a mixture of these.

Preparation of the polymerization solution is performed by the following methods according to the contained amount of the monomer. When the amount of the monomer is a saturated amount of dissolution or less, a polymerization solution is prepared by introducing into a container for manufacturing a polymerization solution the water-rich solvent, the monomer, borodisalicylic acid and/or its salt, and nitrobenzene and/or its derivative, and by dissolving each component to the water-rich solvent by hand process or by use of a mechanical stirring means. When the amount of the monomer exceeds a saturated amount of dissolution, that is, when the monomer undergoes phase separation by introducing into a container for manufacturing a polymerization solution the water-rich solvent, the monomer, borodisalicylic acid and/or its salt, and nitrobenzene and/or its derivative, and by standing still after stirring and homogenization, the polymerization solution can be prepared by dispersing the phase-separated monomer as oil drops in the polymerization solution by giving ultrasonic wave irradiation to the solution. The polymerization solution of the present invention can also be obtained by dispersing the monomer as oil drops with ultrasonic wave irradiation to a solution in which the monomer at an amount exceeding the saturated amount of dissolution is added to the water-rich solvent, and by adding borodisalicylic acid and/or its salt, and nitrobenzene and/or its derivative to the solution obtained.

For ultrasonic wave irradiation, an ultrasonic wave oscillator that is heretofore known, such as an ultrasonic wave washing machine and a cell crusher, can be used without any particular restriction. In order to obtain by ultrasonic wave irradiation a solution in which monomer oil drops are stably dispersed in the water-rich solvent, it is necessary to change the phase-separated monomer to oil drops of a diameter of several μm or less. To achieve this, it is necessary to irradiate the phase-separated solution with ultrasonic waves having a frequency of 15 to 200 kHz, which can generate a cavitation of at least several hundreds of nm to several μm with a strong mechanical action. It is preferable that the output of ultrasonic waves is 4 or more w/cm$^2$. Although there is no strict limitation on the time of the ultrasonic wave irradiation, it is preferably within a range of 2 to 10 minutes. If the irradiation time is longer, there is a tendency that aggregation of the monomer oil drops is inhibited and that the time for demulsification is longer, but when the time of the ultrasonic wave irradiation is 10 minutes or more, a tendency that the effect of inhibiting aggregation of the oil drops is saturated. It is also possible to perform more than one irradiations by using ultrasonic waves with different frequencies and/or outputs. The contained amount of monomer exceeding the saturated amount of dissolution is appropriate as long as it is an amount to obtain a dispersion solution in which demulsification is inhibited by ultrasonic wave irradiation and varies according to not only the type of monomer, but also the type and amount of a supporting electrolyte and the condition of ultrasonic wave irradiation.

The polymerization solution of the present invention may comprise not only the water-rich solvent, at least one monomer having a π-conjugated double bond, at least one supporting electrolyte selected from the group consisting of borodisalicylic acid and borodisalicylic salts and at least one stabilizing agent selected from the group consisting of nitrobenzene and nitrobenzene derivatives, but also other additives as long as they give no harmful influence on the polymerization solution of the present invention. As a preferable additive, a water-soluble nonionic surfactant can be used. Since the monomer is condensed in a micelle of the nonionic surfactant, electrolytic polymerization proceeds rapidly, and a polymer showing high conductivity can be obtained. In addition, because the nonionic surfactant itself is not ionized, doping to a polymer by a borodisalicylate anion is not inhibited, and also the complex formation of the stabilizing agent and a borodisalicylate ion is not inhibited. Therefore, the heat resistance of a conductive polymer obtained by electrolytic polymerization does not decrease.

As the nonionic surfactant, a water-soluble nonionic surfactant heretofore known can be used without particular restriction. It is possible to use, for example, polyalkylene glycol, polyvinyl alcohol, polyoxyalkylene alkyl ether, polyoxyalkylene alkylphenyl ether, polyoxyalkylene styrylphenyl ether, polyoxyalkylene benzylphenyl ether, polyoxyalkylene alkylphenol ether formaldehyde condensate, polyoxyalkylene styrylphenol ether formaldehyde condensate, polyoxyalkylene benzylphenol ether formaldehyde condensate, alkynediol, polyoxyalkylene alkynediol ether, polyoxyalkylene fatty acid ester, polyoxyalkylene sorbitan fatty acid ester, polyoxyalkylene castor oil, polyoxyalkylene hardened castor oil, polyglycerol alkyl ether and polyglycerol fatty acid ester. These can be used alone or used by mixing two or more types. It is preferable to use in the polymerization solution a combination of an alkynediol having a high dispersion effect such as 2,4,7,9-tetramethyl-5-decyne-4,7-diol with other nonionic surfactants, preferably a polyoxyethylene alkylphenyl ether such as branched polyoxyethylene(9) nonyiphenyl ether, because the contained amount of monomer in the polymerization solution can be increased to a great extent.

If the nonionic surfactant is used concurrently, the polymerization solution is prepared by introducing into a container for manufacturing a polymerization solution the water-rich solvent, the monomer, borodisalicylic acid and/or its salt, nitrobenzene and/or its derivative and the nonionic surfactant, and by dissolving each component into the water-rich solvent by hand processing or a mechanical stirring means or an ultrasonic wave radiation. Also, after introducing into a container for producing a polymerization solution the water-rich solvent, the monomer, nitrobenzene and/or its derivative and the nonionic surfactant and preparing a solution in which each component is dissolved in the water-rich solvent, borodisalicylic acid and/or its salt can be added to dissolve in the solution immediately before electrolytic polymerization.

In any preparation method, nitrobenzene and/or its derivative is added to the water-rich solvent at least almost at the same time as borodisalicylic acid and/or its salt, and are preferably added to the water-rich solvent before borodisalicylic acid and/or its salt. If each component in the polymerization solution is stable, there is no restriction on the preparation temperature.

In the polymerization solution of the present invention, water is used as the main solvent. Also, the inexpensive borodisalicylic acid and/or its salt are used as the supporting electrolyte and the precipitate formation by the hydrolysis of borodisalicylate ions is inhibited by the inexpensive nitrobenzene and/or its derivative. It is also possible to repeatedly perform electrolytic polymerization by using the polymerization solution. Therefore, the polymerization solution of the present invention has a small environmental burden and is economically advantageous.

(2) Electrolytic Polymerization

By electrolytic polymerization using the polymerization solution of the present invention, a conductive polymer with high heat resistance is formed. Electrolytic polymerization using the polymerization solution of the present invention is performed to form a conductive polymer film for various applications as well as to form a conductive polymer layer in a solid electrolytic capacitor. Hereinafter, electrolytic polymerization to form a general conductive polymer film and electrolytic polymerization to form a conductive polymer layer in a solid electrolytic capacitor are explained separately.

(a) General Conductive Polymer Film

As a working electrode (a substrate of a conductive polymer film) introduced into the polymerization solution of the present invention, a material having a conductive part at least on its surface is used, and a board, a foil, a net, a sintered compact, a foam of conductive material such as platinum, nickel, titanium, steel and carbon can be used. Also, a transparent substrate in which a vapor deposition layer of a semiconductor ceramic such as tin-doped indium oxide (ITO), tin oxide and fluorine-doped tin oxide is disposed on the surface of transparent and insulated glass or plastic can be used as the working electrode. If EDOT is used as a monomer, a transparent electrode with a transparent PEDOT film can be obtained by using this transparent substrate. As a counter electrode, a board of platinum, nickel and the like can be used.

Electrolytic polymerization is performed using the polymerization solution of the present invention by any of a potentiostatic method, a galvanostatic method or a potential sweep method. In the case of the potentiostatic method, a potential of 1.0 to 1.5 V for a saturated calomel electrode is preferable though this depends on the type of monomer; and in the case of galvanostatic method, a current value of 1 to 10000 $\mu A/cm^2$ is preferable though this depends on the type of monomer; and in the case of the potential sweep method, it is preferable to sweep a range of 0 to 1.5 V for a saturated calomel electrode at a velocity of 5 to 200 mV/s though this depends on the type of monomer. By the electrolytic polymerization, a conductive polymer film is formed on the substrate, preferably with a thickness of 0.001 to 50 μm. There is no strict limitation on the polymerization temperature, but it is generally within a range of 10 to 60 degrees centigrade. The polymerization time is in general within a range of 0.6 seconds to 10 hours.

To obtain a PEDOT film with a significantly high transparency, it is preferable that the galvanostatic polymerization is performed at a current of 5 to 500 $\mu A/cm^2$, preferably at 10 to 100 $\mu A/cm^2$, for 0.6 to 120 seconds, preferably 6 to 60 seconds. By the electrolytic polymerization under this condition, it is possible to obtain a PEDOT film having a significantly high transparency and a thickness of 0.001 to 0.05 μm, and preferably of 0.03 to 0.035 μm.

By washing the conductive polymer film after the electrolytic polymerization with water, ethanol or other liquid and drying it, the conductive polymer film having excellent electrochemical activity and excellent heat resistance can be obtained on the substrate. Since the conductive polymer film of the present invention has excellent adhesiveness with the substrate, it can be used in a configuration disposed on the substrate, and the relatively thick conductive polymer film can be exfoliated from the substrate before use.

When the above-mentioned transparent substrate is used as a substrate and the transparent PEDOT film is formed on the substrate, it is possible to obtain a transparent electrode with excellent heat resistance, high conductivity and high electrochemical capacity while it remains disposed on the substrate. The transparent electrode can be preferably used as a component of various electronic devices such as an organic electroluminescence device and a touch panel display. Further, it is possible to preferably use the PEDOT film as an independent and flexible transparent electrode by exfoliating the film from the substrate and making it a conductive transparent film. It is also possible to prevent static charge by applying the highly transparent PEDOT film to a plastic tray or plastic sheet of insulation without affecting their appearances.

(b) Solid Electrolytic Capacitor of First Form

The solid electrolytic capacitor of the first form of the present invention comprises a positive electrode made of a valve metal foil with an oxide film on its surface and a conductive polymer layer disposed on the positive electrode. To obtain the positive electrode, valve metal foil such as aluminum foil, tantalum foil, niobium foil and titanium foil, preferably aluminum foil, is subjected to a surface enlargement treatment by a chemical or electrochemical etching, and then subject to a formation treatment in an aqueous ammonium adipate solution, an aqueous ammonium phosphate solution and the like to form an oxide film on the surface thereof.

The conductive polymer layer can be directly formed on the oxide film of the positive electrode by using a leakage current of the oxide film. Further, it is possible to dispose a conductive film on the oxide film in advance and to form the conductive polymer layer thereon. For example, the conductive polymer layer may be formed after forming electrical micro defects in the oxide film of the positive electrode by exposing the oxide film to a corrosive gas such as halogen gas, or a corrosive liquid such as an aqueous acid solution. In other way, the conductive polymer layer may be formed after immersing the oxide film of the positive electrode into an aqueous manganese nitrate solution and pyrolyzing at 300 to 400 degrees centigrade to form a manganese oxide layer on the surface of the oxide film. However, considering the stability of the oxide film of the positive electrode and the polymerization efficiency of the conductive polymer, it is preferable to arrange a chemical polymerized film of the monomer on the oxide film and to form the conductive polymer layer on the chemical polymerized film.

The preparation of the chemical polymerized film can be performed by preparing a solution in which both the monomer and an oxidizing agent are dissolved in a solvent such as water, methanol, ethanol, isopropanol, butanol and acetonitrile, applying the solution to the oxide film of the positive electrode by brush application, drop application, immersion application, spray application etc., and drying it. In other way, it can be performed by preparing a solution in which the monomer is dissolved in a solvent such as water, methanol, ethanol, isopropanol, butanol and acetonitrile and a solution in which an oxidizing agent is dissolved in a solvent such as water, methanol, ethanol, isopropanol, butanol and acetonitrile, applying these solutions in alternation on the oxide film of the positive electrode by brush application, drop application, immersion application, spray application etc., and drying them. As the oxidizing agent, it is possible to use a trivalent iron salt such as iron (III) paratoluenesulfonate, iron (III) naphthalenesulfonate and iron (III) anthraquinonesulfonate, or a persulfate salt such as ammonium peroxodisulfate and sodium peroxodisulfate. It is possible to use a single compound and to use two or more types of compounds.

Then, the electrolytic polymerization is performed by introducing into the polymerization solution of the present invention the positive electrode in which conductivity is imparted to the oxide film, together with a counter electrode. As the counter electrode for the electrolytic polymerization, it is possible to use a board of platinum, nickel and the like.

Electrolytic polymerization is performed by any of a potentiostatic method, a galvanostatic method or a potential sweep method. In the case of the potentiostatic method, a potential of 1.0 to 1.5 V for a saturated calomel electrode is preferable though this depends on the type of monomer. In the case of the galvanostatic method, a current value of 1 to 10000 $\mu A/cm^2$ is preferable though this depends on the type of monomer. In the case of the potential sweep method, it is preferable to sweep a range of 0 to 1.5 V for a saturated calomel electrode at a velocity of 5 to 200 mV/s though this depends on the type of monomer. There is no strict limitation on the polymerization temperature, but it is generally within a range of 10 to 60 degrees centigrade. The polymerization time is generally within a range of 1 minute to 10 hours.

The solid electrolytic capacitor of the first form can be obtained by washing the conductive polymer layer formed on the positive electrode with water, ethanol or the like, drying it, and then forming a conductive layer (dummy negative electrode) on the conductive polymer layer by carbon paste, silver paste or the like.

(c) Solid Electrolytic Capacitor of Second Form

The solid electrolytic capacitor of the second form comprises a positive electrode made of valve metal foil having an oxide film on its surface, a negative electrode made of valve metal foil and a separator that retains a conductive polymer layer placed between the positive electrode and the negative electrode. Prior to electrolytic polymerization, a capacitor element comprising a positive electrode made of valve metal foil having an oxide film on its surface, a negative electrode made of valve metal foil and a separator arranged between the positive electrode and the negative electrode is obtained.

The positive electrode is prepared in the same way as the positive electrode in the solid electrolytic capacitor of the first form. That is, valve metal foil such as aluminum foil, tantalum foil, niobium foil and titanium foil, preferably aluminum foil, is subjected to a surface enlargement treatment by a chemical or electrochemical etching, and then subject to a formation treatment in aqueous ammonium adipate solution, aqueous ammonium phosphate solution and the like to form an oxide film on the surface thereof. For the negative electrode, valve metal foil such as aluminum foil, tantalum foil, niobium foil and titanium foil, preferably aluminum foil, is subjected to a surface enlargement treatment by a chemical or electrochemical etching. As the separator, it is possible to use Manila paper, kraft paper, synthetic fiber paper, glass paper and a mixed paper of glass paper and Manila paper or kraft paper.

The capacitor element is obtained by winding or laminating the positive electrode and the negative electrode together with the separator therebetween. Then, by preparing a solution in which both the monomer and an oxidizing agent are dissolved in a solvent such as water, methanol, ethanol, isopropanol, butanol and acetonitrile, immersing the capacitor element in the solution, and then heating the capacitor element to dry it, chemical polymerized films are formed on the surfaces of the positive electrode and the negative electrode. As the oxidizing agent, it is possible to use a trivalent iron salt such as iron (III) paratoluenesulfonate, iron (III) naphthalenesulfonate and iron (III) anthraquinonesulfonate, or a persulfate salt such as ammonium peroxodisulfate and sodium peroxodisulfate. It is possible to use a single compound and to use two or more types of compounds.

The electrolytic polymerization is performed after washing the capacitor element with water, ethanol and the like, drying it, and then introducing it into the polymerization solution of the present invention.

The electrolytic polymerization is performed by any of a potentiostatic method, a galvanostatic method or a potential sweep method. In the case of the potentiostatic method, a potential of 1.0 to 1.5 V for a saturated calomel electrode is preferable though this depends on the type of monomer. In the case of the galvanostatic method, a current value of 1 to 10000 RA/cm² is preferable though this depends on the type of monomer. In the case of the potential sweep method, it is preferable to sweep a range of 0 to 1.5 V for a saturated calomel electrode at a velocity of 5 to 200 mV/s though this depends on the type of monomer. There is no strict limitation on the polymerization temperature, but it is generally within a range of 10 to 60 degrees centigrade. The polymerization time is generally within a range of 1 minute to 10 hours.

After the electrolytic polymerization, by washing the conductive polymer layer retained by the separator with water, ethanol or the like, and drying it, the solid electrolytic capacitor of the second form having excellent heat resistance can be obtained.

The solid electrolytic capacitor of the first form and the solid electrolytic capacitor of the second form have excellent heat resistance as well as reduced tan δ and ESR.

EXAMPLES

The examples of the present invention are shown as follows, but the present invention is not limited to the following examples.

(1) Confirmation of Precipitation Formation

Experiment 1

Three types of solution in which p-nitrophenol of a different concentration and 0.08 M of ammonium borodisalicylate were added and dissolved in 50 mL of distilled water were prepared. The concentration of p-nitrophenol was 0.010 M, 0.050 M or 0.100 M. These solutions were left overnight. Precipitation was not observed in any of the solutions.

Experiment 2

Three types of solution in which m-nitrophenol of a different concentration and 0.08 M of ammonium borodisalicylate were added and dissolved in 50 mL of distilled water were prepared. The concentration of m-nitrophenol was 0.010 M, 0.050 M or 0.100 M. These solutions were left overnight. Precipitation was not observed in any of the solutions.

Experiment 3

P-nitrophenol and p-nitrobenzoic acid were mixed at a mole ratio of 9:1. Three types of solution in which the mixture of a different concentration and 0.08 M of ammonium borodisalicylate were added and dissolved in 50 mL of distilled water were prepared. The concentration of the mixture was 0.010 M, 0.050 M or 0.100 M in the total of both compounds. These solutions were left overnight. Precipitation was not observed in any of the solutions.

Comparative Experiment 1

When 0.08 M of ammonium borodisalicylate was added and dissolved in 50 mL of distilled water, a large amount of precipitates were immediately produced. These precipitates were salicylic acid and boric acid, which have extremely small solubility in water (see FIG. 1).

Comparative Experiment 2

Three types of solution in which 4-hydroxyacetophenone of a different concentration and 0.08 M of ammonium borodisalicylate were added and dissolved in 50 mL of distilled water were prepared. The concentration of 4-hydroxyacetophenone was 0.010 M, 0.050 M or 0.100 M. These solutions were left overnight. Precipitation was produced in all of the solutions. Therefore, it was presumed that the effect of inhibiting the precipitation formation in Experiments 1 and 2 was not attributable to a hydroxy group.

Comparative Experiment 3

4-hydroxyacetophenone and 2-hydroxybenzoic acid were mixed at a mole ratio of 9:1. Three types of solution in which the mixture of a different concentration and 0.08 M of ammonium borodisalicylate were added and dissolved in 50 mL of distilled water were prepared. The concentration of the above-mentioned mixture was 0.010 M, 0.050 M or 0.100 M in the total of both compounds. These solutions were left overnight. Precipitation was produced in all of the solutions. Therefore, it was presumed that the effect of inhibiting the precipitation formation in Experiment 3 was not attributable to a hydroxy group or a carboxy group.

(2) Preparation of Polymerization Solution

Example 1

A solution was obtained by introducing 50 mL of distilled water into a glass container, adding 0.113 g (concentration; 0.016 M) of EDOT to this solution and stirring it at 25 degrees centigrade for 60 minutes. The total amount of EDOT was dissolved in water. A polymerization solution containing EDOT, p-nitrophenol and ammonium borodisalicylate in water was obtained by adding 0.7 g (concentration; 0.1 M) of p-nitrophenol and 1.08 g (concentration; 0.08 M) of ammonium borodisalicylate to this solution in this order and stirring them uniformly. Even when the obtained solution was left for one day at room temperature, precipitate formation was not observed.

Example 2

The procedure of Example 1 was repeated, except that 0.35 g (concentration; 0.05 M) of p-nitrophenol was used. Even when the obtained solution was left for one day at room temperature, precipitate formation was not observed.

Example 3

The procedure of Example 1 was repeated, except that 0.14 g (concentration; 0.02 M) of p-nitrophenol was used. Even when the obtained solution was left for one day at room temperature, precipitate formation was not observed.

Example 4

A solution was obtained by introducing 50 mL of distilled water into a glass container, adding 0.14 g (concentration; 0.02 M) of EDOT to this solution. EDOT and water were phase-separated. When ultrasonic waves of 20 kHz frequency and 2.6 w/cm² output were radiated into this solution for 5 minutes, an emulsion in which EDOT was dispersed in water as oil drops was obtained. The size of the EDOT oil drops of this solution were measured by a dynamic light scattering method at 25 degrees centigrade. The number average size of the oil drops was 214 nm. Then, a polymerization solution was obtained by adding 0.7 g (concentration; 0.1 M) of p-nitrophenol and 1.08 g (concentration; 0.08 M) of ammonium borodisalicylate to this solution in this order and stirring them uniformly. Even when the obtained solution was left for one day at room temperature, precipitate formation was not observed.

Example 5

A polymerization solution was obtained by introducing 50 mL of distilled water into a glass container, adding 2,4,7,9-tetramethyl-5-decyne-4,7-diol as an nonionic surfactant in an amount of 0.4% by mass, then adding 0.18 g (concentration; 0.025 M) of EDOT, 0.35 g (concentration; 0.05 M) of p-nitrophenol and 1.08 g (concentration; 0.08 M) of ammonium borodisalicylate and stirring them uniformly. The monomer amount is equivalent to almost the maximum of a monomer amount that can be dissolved in an aqueous solution containing the surfactant.

Example 6

A polymerization solution was obtained by introducing 50 mL of distilled water into a glass container, adding branched polyoxyethylene(9) nonylphenyl ether as an nonionic surfactant in an amount of 1.0% by mass, then adding 0.21 g (concentration; 0.03 M) of EDOT, 0.35 g (concentration; 0.05 M) of p-nitrophenol and 1.08 g (concentration; 0.08 M) of ammonium borodisalicylate and stirring them uniformly. The monomer amount is equivalent to almost the maximum of a monomer amount that can be dissolved in an aqueous solution containing the surfactant.

Example 7

A polymerization solution was obtained by introducing 50 mL, of distilled water into a glass container, adding 2,4,7,9-tetramethyl-5-decyne-4,7-diol in an amount of 0.4% by mass and branched polyoxyethylene(9) nonylphenyl ether in an amount of 1.0% by mass, then adding 0.57 g (concentration; 0.08 M) of EDOT, 0.35 g (concentration; 0.05 M) of p-nitrophenol and 1.08 g (concentration; 0.08 M) of ammonium borodisalicylate and stirring them uniformly. The monomer amount is equivalent to almost the maximum of a monomer amount that can be dissolved in an aqueous solution containing the surfactants.

Comparative Example 1

The procedure of Example 1 was repeated, except that 0.07 g (concentration; 0.01 M) of p-nitrophenol was used. When the obtained solution was left for one day at room temperature, a slight amount of precipitates was observed. In comparative experiment of electrolytic polymerization shown below, a solution was used that did not contain precipitates immediately after p-nitrophenol and ammonium borodisalicylate were added.

Comparative Example 2

When 1.08 g (concentration; 0.08 M) of ammonium borodisalicylate was added to the solution used in Example 1 in which only the EDOT was dissolved in water and it was stirred, a large amount of precipitates were immediately produced. These precipitates were salicylic acid and boric acid, which have extremely small solubility in water (see FIG. 1). In comparative experiment of electrolytic polymerization shown below, a solution was used that did not contain precipitates immediately after ammonium borodisalicylate was added.

(2) Electrolytic Polymerization I: Production and Evaluation of Solid Electrolytic Capacitor Example 8

An etched aluminum foil was subjected to the formation treatment to obtain a oxide film with pressure resistance of 3 V and was then punched out to 1×1 cm$^2$ of a projected area to make it a positive electrode. This positive electrode was immersed in an ethanol solution containing 20% by mass of EDOT and was then dried at room temperature. Then, it was immersed in an ethanol solution containing iron (III) para-toluenesulfonate as an oxidizing agent with a concentration of 20% by mass, dried at room temperature for 10 minutes and then high-temperature treatment was performed on it. A chemical polymerized film of PEDOT was formed on the oxide film of the positive electrode by repeating the chemical oxidation polymerization process. The positive electrode having the chemical polymerized film of PEDOT obtained was subjected to the re-formation treatment in an aqueous ammonium adipate solution, and then it was water-washed and dried.

Then, galvanostatic electrolytic polymerization was performed for 60 minutes under a current condition of 0.5 mA/cm$^2$ by using the polymerization solution of Example 1, the positive electrode with the chemical polymerized film of PEDOT as a working electrode, a Pt foil having an area of 4 cm×4 cm as a counter electrode, and a silver-silver chloride electrode as a reference electrode. Precipitation was not observed in the polymerization solution even after polymerization, and it was possible to repeat polymerization by using the same polymerization solution. The polymerized film was washed with ethanol, water-washed, and then dried. Lastly, a graphite paste was applied on the electrolytic polymerization layer of PEDOT and drying, and then silver paste was applied on it and drying, to obtain a solid electrolytic capacitor having a positive electrode having an oxide film with pressure resistance of 3 V.

Example 9

The procedure of Example 8 was repeated, except that the polymerization solution of Example 2 was used instead of the polymerization solution of Example 1. Precipitation was not observed in the polymerization solution even after polymerization, and it was possible to repeat polymerization by using the same polymerization solution.

Example 10

The procedure of Example 8 was repeated, except that the polymerization solution of Example 4 was used instead of the polymerization solution of Example 1. Precipitation was not observed in the polymerization solution even after polymerization, and it was possible to repeat polymerization by using the same polymerization solution.

Comparative Example 3

The procedure of Example 8 was repeated, except that the polymerization solution of Comparative Example 1 (before precipitate formation) was used instead of the polymerization solution of Example 1. Precipitates started to be produced in the polymerization solution during polymerization, and it was difficult to repeat polymerization using the same polymerization solution.

Comparative Example 3

The procedure of Example 8 was repeated, except that the polymerization solution of Comparative Example 2 (before precipitate formation) was used instead of the polymerization solution of Example 1. Precipitates started to be produced in the polymerization solution during polymerization, and it was difficult to repeat polymerization using the same polymerization solution.

Conventionally, in order to increase a concentration of EDOT with poorly water solubility in water, an anionic surfactant with a sulfonic acid group or a sulfonic acid salt group has been frequently used as a supporting electrolyte, and it is reported that a solid electrolytic capacitor comprising a PEDOT layer in which an anion of the surfactant is doped has excellent thermal durability because de-doping is inhibited by the bulkiness of the dopant (See Patent Document 5). Therefore, in order to compare the solid electrolytic capacitor of the present invention with the conventional capacitors, the following experiments were carried out.

Comparative Example 5

A polymerization solution was obtained by introducing 50 mL of water into a glass container, adding to this solution 0.14 g (concentration; 0.02 M) of EDOT and 1.08 g (concentration; 0.08 M) of sodium butylnaphthalenesulfonate, which is a surfactant having a sulfonic acid salt group, and stirring it at 25 degrees centigrade for 60 minutes. Then, galvanostatic electrolytic polymerization was performed for 60 minutes under a current condition of 0.5 mA/cm$^2$ by using the polymerization solution, the positive electrode with a chemical polymerized film of PEDOT used in Example 8 as a working electrode, a Pt foil having an area of 4 cm×4 cm as a counter electrode, and a silver-silver chloride electrode as a reference electrode. The film after polymerization was washed with ethanol, water-washed, and then dried. Lastly, a graphite paste was applied on the electrolytic polymerization layer of PEDOT and drying, and then silver paste was applied on it and drying, to obtain a solid electrolytic capacitor having a positive electrode having an oxide film with pressure resistance of 3 V.

Comparative Example 6

The positive electrode having a chemical polymerized film of PEDOT used in Example 8 was used. Separately prepared slurry in which PEDOT and polystyrene sulfonic acid were dispersed was applied on the chemical polymerized film of the positive electrode and dried. Lastly, a graphite paste was applied on the layer obtained from the slurry in which PEDOT and polystyrene sulfonic acid were dispersed and drying, and then silver paste was applied on it and drying, to obtain a solid electrolytic capacitor having a positive electrode having an oxide film with pressure resistance of 3 V.

For the capacitors of Examples 8 to 10 and Comparative Examples 3 to 6, a real-capacitance recovery (Real-CR) and tan δ in 120 Hz, as well as ESR in 100 kHz were measured. The "real-capacitance recovery" means a capacitance recovery calculated on the basis of a capacitance of an oxide film after forming a chemical polymerized film and an electrolytic polymerization layer of PEDOT. In Table 1, "AmBS" represents ammonium borodisalicylate and "p-Nph" represents p-nitrophenol.

TABLE 1

|  | AmBS Conc. (M) | p-Nph Conc. (M) | Real-CR (%) | tan δ | ESR (mΩ) | Precipitation |
|---|---|---|---|---|---|---|
| Example 8 | 0.08 | 0.10 | 73 | 0.031 | 2.2 | absence |
| Example 9 | 0.08 | 0.05 | 76 | 0.032 | 2.0 | absence |
| Example 10 | 0.08 | 0.10 | 73 | 0.031 | 2.1 | absence |
| Comparative Example 3 | 0.08 | 0.01 | 74 | 0.045 | 3.0 | presence |
| Comparative Example 4 | 0.08 | — | 69 | 0.032 | 3.1 | presence |
| Comparative Example 5 | — | — | 66 | 0.038 | 3.0 | — |
| Comparative Example 6 | — | — | 68 | 0.040 | 4.9 | — |

As can be understood from Table 1, the capacitors of Examples 8 to 10 and Comparative Examples 3 and 4 had high real-capacitance recovery compared with the capacitors of Comparative Examples 5 and 6 having a PEDOT layer in which an anion of the anionic surfactant with a sulfonic acid group or a sulfonic acid salt group was doped. In addition, the capacitors of Examples 8 to 10 and Comparative Example 4 showed excellent capacitor characteristics in that both tan δ and ESR are low compared with the capacitors of Comparative Examples 5 and 6. Also, it can be understood from Table 1 that the capacitors of Examples 8 to 10 had a lower ESR than the capacitors of Comparative Examples 3 and 4. Since the polymerization solutions that were used for obtaining the capacitors of Comparative Examples 3 and 4 did not contain a sufficient amount of p-nitrophenol, precipitation by the hydrolysis of borodisalicylate ions was generated, which increased the ESR of the capacitors of Comparative Examples 3 and 4.

Further, for the capacitors of Examples 8 to 10 and Comparative Examples 4 to 6, changes in ESR and the real-capacitance recovery were evaluated by performing thermal aging in the atmosphere at 150 degrees centigrade for 600 hours. The results are shown in Table 2.

TABLE 2

|  | Δ Real-CR (%) | Δ ESR (%) |
|---|---|---|
| Example 8 | 88 | 640 |
| Example 9 | 87 | 650 |
| Example 10 | 88 | 650 |
| Comparative Example 4 | 87 | 640 |
| Comparative Example 5 | 70 | 1600 |
| Comparative Example 6 | 90 | 2200 |

While ESR of the capacitors of Comparative Examples 5 and 6 reached 16 and 22 times as high as the initial values, respectively, after experiencing a high temperature of 150 degrees centigrade for 600 hours, ESR of the capacitors of Examples 8 to 10 and Comparative Example 4 was merely 6.4-6.5 times as high as the initial value even after experiencing a high temperature of 150 degrees centigrade for 600 hours. Also, while the real-capacitance recovery of the capacitors of Examples 8 to 10 and Comparative Examples 4 and 6 was maintained at approximately 90% of the initial value even after experiencing a high temperature of 150 degree centigrade for 600 hours, the real-capacitance recovery of the capacitor of Comparative Example 5 decreased to approximately 70% of the initial value after experiencing a high temperature of 150 degree centigrade for 600 hours.

Therefore, it was revealed that the solid electrolytic capacitor having a PEDOT layer obtained from the polymerization solution in which ammonium borodisalicylate was added to water as the supporting electrolyte has more excellent heat resistance than the conventional solid electrolytic capacitor comprising a PEDOT layer in which an anion of an anionic surfactant having a sulfonic acid group or a sulfonic acid salt group was doped. Although this excellent advantage has not been known so far, it was impossible to repeat polymerization using the same polymerization solution due to the problem of the above-mentioned precipitation in the polymerization solution (Comparative Example 2) used for producing the capacitor of Comparative Example 4. On the other hand, the polymerization solutions (Examples 1, 2 and 4) used for producing the solid electrolytic capacitors of Examples 8 to 10 did not have such a problem of precipitation and could be used repeatedly for polymerization. In addition, also in terms of heat resistance, the heat resistance of the solid electrolytic capacitors of Examples 8 to 10 was equal to that of the capacitor of Comparative Example 4 and showed heat resistance that was significantly better compared with the capacitors of Comparative Examples 5 and 6. Further, the capacitor of Example 8 showed almost the same initial characteristic and thermal durability as the capacitor of Example 10, and it was found that regardless of whether EDOT in a polymerization solution was less than a saturated amount of dissolution or exceeded the saturated amount, it was possible to obtain a capacitor that has an equal initial characteristic and excellent heat resistance.

(3) Electrolytic Polymerization II: Production and Evaluation of Solid Electrolytic Capacitor Example 11

An etched aluminum foil was subjected to the formation treatment to obtain a oxide film with pressure resistance of 3 V and was then punched out to 1×1 $cm^2$ of a projected area to make it a positive electrode. This positive electrode was immersed in an ethanol solution containing 20% by mass of EDOT and was then dried at room temperature. Then, it was immersed in an ethanol solution containing iron (III) para-toluenesulfonate as an oxidizing agent with a concentration of 20% by mass, dried at room temperature for 10 minutes and then high-temperature treatment was performed on it. A chemical polymerized film of PEDOT was formed on the oxide film of the positive electrode by repeating the chemical oxidation polymerization process. The positive electrode having the chemical polymerized film of PEDOT obtained was subjected to the re-formation treatment in an aqueous ammonium adipate solution, and then it was water-washed and dried.

A solution was obtained by introducing 50 mL of distilled water into a glass container, adding 0.104 g (concentration; 0.0147 M) of EDOT to this solution and stirring it at 25 degrees centigrade for 60 minutes. The total amount of EDOT was dissolved in water. A polymerization solution was obtained by adding 0.35 g (concentration; 0.05 M) of p-nitrophenol and 1.08 g (concentration; 0.08 M) of ammonium borodisalicylate to this solution in this order and stirring them uniformly. Then, galvanostatic electrolytic polymerization was performed for 30 minutes under a current condition of 1 $mA/cm^2$ by using the polymerization solution, the positive electrode with the chemical polymerized film of PEDOT as an working electrode, a Pt foil having an area of 4 cm×4 cm as a counter electrode, and a silver-silver chloride electrode as a reference electrode. Precipitation was not observed in the polymerization solution even after polymerization, and it was possible to repeat polymerization by using the same polymerization solution. The polymerized film was washed with ethanol, water-washed, and then dried. Lastly, a graphite paste was applied on the electrolytic polymerization layer of PEDOT and drying, and then silver paste was applied on it and drying, to obtain a solid electrolytic capacitor having a positive electrode having an oxide film with pressure resistance of 3 V.

Example 12

The procedure of Example 11 was repeated, except that the polymerization solution of Example 5 was used instead of the polymerization solution used in Example 11.

Example 13

The procedure of Example 11 was repeated, except that the polymerization solution of Example 6 was used instead of the polymerization solution used in Example 11.

Example 14

The procedure of Example 11 was repeated, except that the polymerization solution of Example 7 was used instead of the polymerization solution used in Example 11

Comparative Example 7

A polymerization solution was obtained by introducing 50 mL of water into a glass container, adding to this solution sodium butylnaphthalenesulfonate as an anionic surfactant in an amount of 2.7% by mass, then adding 0.21 g (concentration; 0.03 M) of EDOT and stirring them uniformly. The monomer amount is equivalent to almost the maximum of a monomer amount that can be dissolved in an aqueous solution containing the surfactant. Then, galvanostatic electrolytic polymerization was performed for 30 minutes under a current condition of 1 $mA/cm^2$ by using the polymerization solution, the positive electrode with the chemical polymerized film of PEDOT used in Example 11 as a working electrode, a Pt foil having an area of 4 cm×4 cm as a counter electrode, and a silver-silver chloride electrode as a reference electrode. The polymerized film was washed with ethanol, water-washed, and then dried. Lastly, a graphite paste was applied on the electrolytic polymerization layer of PEDOT and drying, and then silver paste was applied on it and drying, to obtain a solid electrolytic capacitor having a positive electrode having an oxide film with pressure resistance of 3 V.

For the capacitors of Examples 11 to 14 and Comparative Example 7, the value of real-capacitance recovery in 120 Hz and the value of ESR in 100 kHz were measured. Also, changes in ESR were evaluated by performing thermal aging in the atmosphere at 150 degree centigrade for 200 hours. The results are shown in Table 3.

TABLE 3

| | Monomer Conc. (mM) | Real-CR (%) | ESR (mΩ) | ESR increase after 200 hours (%) |
|---|---|---|---|---|
| Example 11 | 0.0147 | 76 | 2.5 | 16.7 |
| Example 12 | 0.025 | 78 | 1.4 | 21.4 |
| Example 13 | 0.030 | 78 | 1.2 | 16.7 |
| Example 14 | 0.080 | 81 | 1.1 | 18.2 |
| Comparative Example 7 | 0.030 | 76 | 2.5 | 90.0 |

As can be understood from Table 3, in Examples 11 to 14, ESR decreased as the monomer concentration in the polymerization solution increased by using a nonionic surfactant, and in Example 14, where the monomer concentration increased significantly, the real-capacitance recovery increased. This seems to reflect that the electrolytic polymerization progresses rapidly and the polymer exhibiting a high conductivity can be obtained because the monomer is condensed in a micelle of the nonionic surfactant, and that the nonionic surfactant does not have a harmful effect on doping by a dopant. Further, in the heat resistance test, the solid electrolytic capacitors of Examples 12 to 14, which were obtained from the polymerization solutions having a nonionic surfactant, showed almost the same heat resistance as the solid electrolytic capacitor of Example 11 obtained from the polymerization solution without a nonionic surfactant. Therefore, it was judged that the complex formation of p-nitrophenol and a borodisalicylate ion was not inhibited by the nonionic surfactant and that doping to a polymer by the borodisalicylate anion was not inhibited by the nonionic surfactant. On the other hand, the solid electrolytic capacitor of Comparative Example 7 obtained from the polymerization solution having an anionic surfactant as a supporting electrolyte was significantly inferior to the solid electrolytic capacitors of Examples 11 to 14 in terms of heat resistance.

INDUSTRIAL APPLICABILITY

A conductive polymer obtained from a polymerization solution of the present invention is applied in a wide range of fields such as solid electrolytic capacitors, polymer batteries, antistatic films, indicating elements, sensors and electrode materials.

What is claimed is:

1. A polymerization solution for electrolytic polymerization of monomer having a π-conjugated double bond, comprising:
    a solvent consisting of 100 to 80% by mass of water and 0 to 20% by mass of an organic solvent;
    at least one monomer having a π-conjugated double bond;
    at least one supporting electrolyte selected from the group consisting of borodisalicylic acid and borodisalicylic salts; and
    at least one stabilizing agent selected from the group consisting of nitrobenzene and nitrobenzene derivatives, wherein the content of the stabilizing agent is more than ⅛ mol per 1 mol of the supporting electrolyte.

2. The polymerization solution according to claim 1, wherein the stabilizing agent is at least one compound selected from the group consisting of o-nitrophenol, m-nitrophenol and p-nitrophenol.

3. The polymerization solution according to claim 1, wherein the solvent consists only of water.

4. The polymerization solution according to claim 1, wherein the stabilizing agent is p-nitrophenol and the content of p-nitrophenol is ¼ mol or more per 1 mol of the supporting electrolyte.

5. The polymerization solution according to claim 1, wherein the monomer is 3,4-ethylenedioxythiophene.

6. The polymerization solution according to claim 1, further comprising at least one nonionic surfactant.

7. The polymerization solution according to claim 6, wherein the nonionic surfactant is a mixture of an alkynediol and a polyoxyethylene alkylphenyl ether.

8. The polymerization solution according to claim 1, wherein the monomer is dispersed as oil drops in the polymerization solution.

9. A conductive polymer film obtained by introducing a substrate with a conductive part at least on the surface in the polymerization solution according to claim 1 and then performing electrolytic polymerization.

10. A solid electrolytic capacitor comprising:
    a positive electrode made of valve metal foil with an oxide film on the surface; and
    a conductive polymer layer on the positive electrode, wherein the conductive polymer layer is formed by introducing the positive electrode in the polymerization solution according to claim 1 and then performing electrolytic polymerization.

11. A solid electrolytic capacitor comprising:
    a positive electrode made of valve metal foil with an oxide film on the surface,
    a negative electrode made of valve metal foil; and
    a separator retaining an conductive polymer layer between the positive electrode and the negative electrode, wherein the conductive polymer layer is formed by introducing in the polymerization solution according to claim 1 a capacitor element comprising the positive electrode, the negative electrode and a separator therebetween, impregnating the polymerization solution in the capacitor element and then performing electrolytic polymerization.

12. A conductive polymer film obtained by introducing a substrate with a conductive part at least on the surface in the polymerization solution according to claim 3 and then performing electrolytic polymerization.

13. A solid electrolytic capacitor comprising:
    a positive electrode made of valve metal foil with an oxide film on the surface; and
    a conductive polymer layer on the positive electrode, wherein the conductive polymer layer is formed by introducing the positive electrode in the polymerization solution according to claim 3 and then performing electrolytic polymerization.

14. A solid electrolytic capacitor comprising:
    a positive electrode made of valve metal foil with an oxide film on the surface,
    a negative electrode made of valve metal foil; and
    a separator retaining an conductive polymer layer between the positive electrode and the negative electrode, wherein the conductive polymer layer is formed by introducing in the polymerization solution according to claim 3 a capacitor element comprising the positive electrode, the negative electrode and a separator therebetween, impregnating the polymerization solution in the capacitor element and then performing electrolytic polymerization.

15. A conductive polymer film obtained by introducing a substrate with a conductive part at least on the surface in the polymerization solution according to claim 5 and then performing electrolytic polymerization.

16. A solid electrolytic capacitor comprising:
    a positive electrode made of valve metal foil with an oxide film on the surface; and
    a conductive polymer layer on the positive electrode, wherein the conductive polymer layer is formed by introducing the positive electrode in the polymerization solution according to claim 5 and then performing electrolytic polymerization.

17. A solid electrolytic capacitor comprising:
    a positive electrode made of valve metal foil with an oxide film on the surface,
    a negative electrode made of valve metal foil; and
    a separator retaining an conductive polymer layer between the positive electrode and the negative electrode, wherein the conductive polymer layer is formed by introducing in the polymerization solution according to claim 5 a capacitor element comprising the positive electrode, the negative electrode and a separator therebetween, impregnating the polymerization solution in the capacitor element and then performing electrolytic polymerization.

18. A conductive polymer film obtained by introducing a substrate with a conductive part at least on the surface in the polymerization solution according to claim 7 and then performing electrolytic polymerization.

19. A solid electrolytic capacitor comprising:
a positive electrode made of valve metal foil with an oxide film on the surface; and
a conductive polymer layer on the positive electrode, wherein the conductive polymer layer is formed by introducing the positive electrode in the polymerization solution according to claim 7 and then performing electrolytic polymerization.

20. A solid electrolytic capacitor comprising:
a positive electrode made of valve metal foil with an oxide film on the surface,
a negative electrode made of valve metal foil; and
a separator retaining an conductive polymer layer between the positive electrode and the negative electrode, wherein the conductive polymer layer is formed by introducing in the polymerization solution according to claim 7 a capacitor element comprising the positive electrode, the negative electrode and a separator therebetween, impregnating the polymerization solution in the capacitor element and then performing electrolytic polymerization.

* * * * *